United States Patent [19]

Kabotoff

[11] 4,127,154

[45] Nov. 28, 1978

[54] TREE HARVESTING APPARATUS

[76] Inventor: Lionel W. Kabotoff, Iron Mountain Rd., P.O. Box 1661, Merritt, British Columbia, Canada, VoK 2Bo

[21] Appl. No.: 695,725

[22] Filed: Jun. 14, 1976

[51] Int. Cl.² .............................................. A01G 23/08
[52] U.S. Cl. .................................. 144/3 D; 144/34 E
[58] Field of Search ..................... 144/3 D, 2 Z, 34 R, 144/34 E, 309 AC; 214/82

[56] References Cited

U.S. PATENT DOCUMENTS

| | | | |
|---|---|---|---|
| 3,416,678 | 12/1968 | Blonsky | 214/82 |
| 3,498,347 | 3/1970 | Vit | 144/34 R |
| 3,542,099 | 11/1970 | Gibson | 144/34 R |
| 3,631,905 | 1/1970 | Karlin | 144/34 E |
| 3,643,712 | 2/1972 | Doel et al. | 144/3 D |
| 3,646,975 | 3/1972 | McNeil, Sr. et al. | 144/34 E |

Primary Examiner—Othell M. Simpson
Assistant Examiner—W. D. Bray
Attorney, Agent, or Firm—Carver and Company

[57] ABSTRACT

Tree harvesting apparatus adapted to be fitted to conventional vehicle for use in relatively hilly terrain. The apparatus has holding and cutting means including a main post carrying upper and lower grapples to hold tree, and cutting means disposed below the lower grapple. Post is mounted on a hinge mounting carried on vehicle for swinging relative to vehicle about a generally vertical cutting position. Hinge mounting permits forward and backward tilting movement relative to the vehicle, and sideways tilting means permits similar relative sideways tilting movement so that grapples can cooperate with tree notwithstanding uneven terrain. Main post can slide transversely relative to vehicle to provide lateral movement of grapples. Cutting means has sliding knife blade which cooperates with opposed anvil having recessed inner face to accept knife blade. Bunk carried on vehicle behind the driver's cab accepts cut log from grapples when post is swung to inclined unloading position in which bunk is beneath the log. Bunk is tiltable for unloading and has first stake hinged to retract for unloading, and transversely movable second stake to position logs on, and to unload log from, the bunk.

23 Claims, 8 Drawing Figures

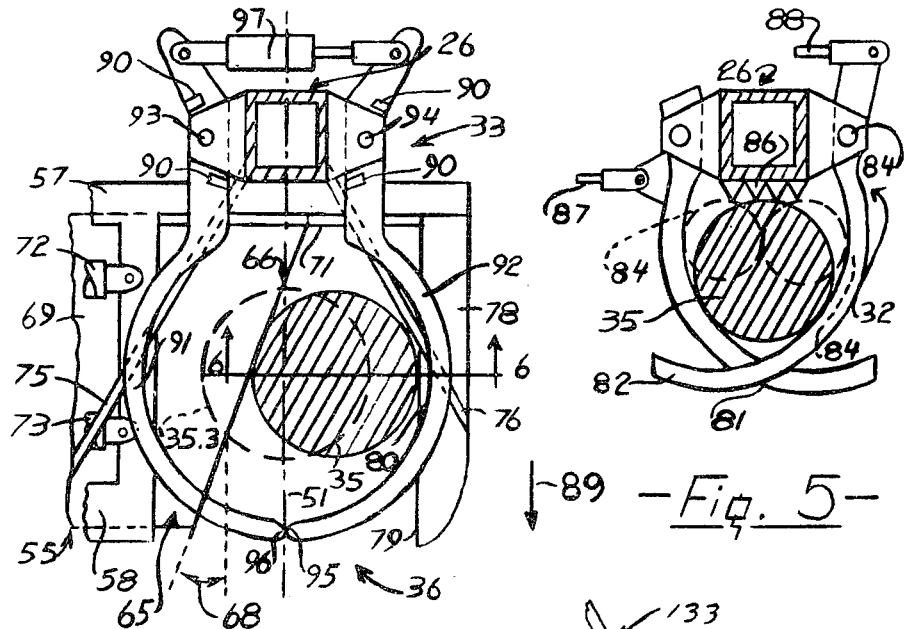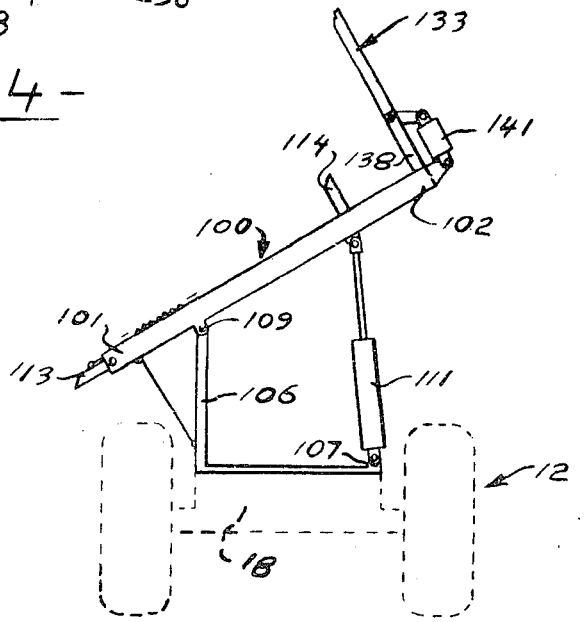

TREE HARVESTING APPARATUS

BACKGROUND OF THE INVENTION

1. Field of the Invention

The invention relates to an apparatus adapted for harvesting trees, in particular for cutting and transporting trees in relatively hilly terrain.

2. Prior Art

There are many tree harvesting machines adapted for use in relatively level terrain in which ground gradients rarely exceed a few percent. Also, there are machines for harvesting widely spaced trees which permit use of a relatively large machine which can be cumbersome to manoeuvre to position tree holding and cutting means, eg. grapples and shears prior to cutting. Such machines are generally limited in their application to widely spaced trees growing on level terrain. Furthermore, the devices described above commonly only cut the tree and the fallen tree is then collected by another machine or cable apparatus. Commonly, the shears of such machines usually require extensive maintenance in order to produce acceptable cuts. Notwithstanding such maintenance it is not uncommon for prior art shears to split a tree for many feet longitudinally form the cut, thus incurring excessive waste of lumber.

Many of the prior art machines known to the inventor would be unsuitable for use in relatively mountainous terrain because such machines could not climb the relatively steep gradients, nor pass between relatively closely spaced trees found in forests in mountains, particularly on the west coast of North America. In such terrain, for environmental and practical reasons, it is preferable to move mobile heavy equipment as little as possible. Thus common harvesters which only cut the trees require an additional piece of apparatus to remove the falled trees. If a separate log retrieving vehicle is used the terrain would be subject to passage of at least two vehicles. Alternatively, cable systems could be used but these are limited in their range of application, and are costly and time consuming to reposition for retrieving logs from different areas of the forest.

Furthermore tree harvesting devices known to the inventor are relatively costly, single-purpose machines which represent a large investment and yet can only be used for one purpose, namely harvesting trees. Thus, because such machines can be made idle for long periods of time due to weather conditions, terrain conditions, etc., a relatively long period of time is required for recovery of investment in such machines.

SUMMARY OF THE INVENTION

The present invention reduces some of the difficulties and disadvantages of the prior art by providing an apparatus which is less costly than prior art tree harvesting machines and which can be fitted to an existing logging vehicle, such as a skidder, and thus, when the invention is not in use, the skidder or other vehicle can be used for other duties. Furthermore the device when fitted to a skidder, can be used in relatively mountainous terrain to which a skidder is suited, permitting mechanical harvesting of trees in areas that were previously considered uneconomic or impossible to harvest with the present mechanical harvesting equipment. When fitted to a small skidder, the device is compact and relatively narrow to permit the skidder to pass between relatively closely spaced trees. The apparatus has a tree cutting means which does not require extensive maintenance and furthermore appears to have less tendency to split trees than prior art shears. The apparatus of the invention can not only cut trees, but also can retrieve the trees from the forest. This reduces the environmental damage to mountainous terrain by eliminating a specialized retrieval vehicles, or costly and time consuming cable systems.

A tree harvesting apparatus according to the invention has a holding and cutting means and a storing means, and is adapted to be used with a suitable vehicle, such as a skidder. The holding and cutting means are characterized by a main post mounted for swinging relative to the vehicle about a generally vertical cutting position in which the post has upper and lower ends. A hinge mounting adapted to be mounted on the vehicle cooperates with the post to mount the post for forward and backward tilting movement relative to the vehicle when viewed laterally between the essentially vertical cutting position and an inclined unloading position. Upper and lower grapples are provided adjacent the upper and lower ends of the post and are adapted to close and open so as to enclose a tree therein. Tree cutting means are mounted adjacent the lower end of the post and disposed below the lower grapple when the post is generally vertical. The storing means includes a bunk adapted to be carried on the vehicle and positioned so that when the post is swung relative to the vehicle to the unloading position, the bunk cooperates with the upper and lower grapples to accept a log therefrom.

A detailed disclosure following, related to drawings, describes a preferred embodiment of the invention, which is capable of expression in structure other than that particularly described and illustrated.

DESCRIPTION OF THE DRAWINGS

FIG. 4 is a simplified, fragmented section in a horizontal plane of a lower grapple and knife means prior to severing the tree the grapple being shown closed with the knife means commencing a cut, FIG. 5 is a simplified, fragmented section in a horizontal plane of an upper grapple holding a tree.

FIG. 8 appearing on sheet 3 of the drawings, is a simplified end elevation of the storing means of FIG. 7 shown in a discharging position, some portions being omitted.

DETAILED DISCLOSURE

Figure 1:
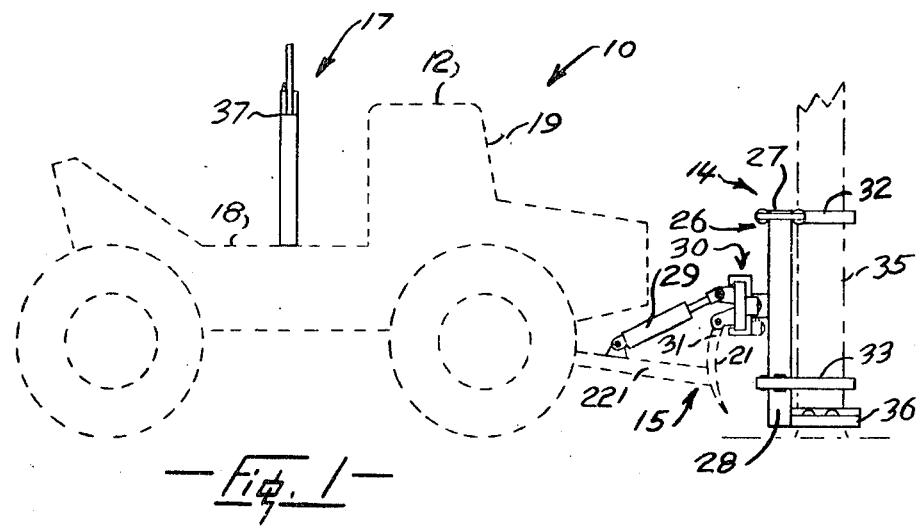
FIG. 1 is a simplified diagrammatic side elevation of the invention shown fitted to a skidder, the invention being in a cutting position, grapples thereof cooperating with a tree.
Figure 2:
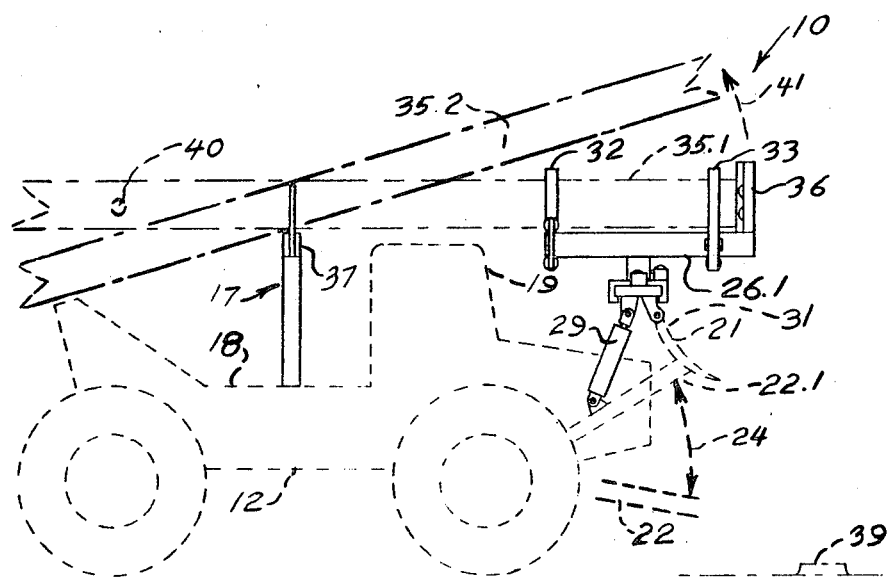
FIG. 2 is a simplified diagrammatic side elevation of the invention shown in an inclined unloading position prior to releasing a log from the grapples thereof.

FIGS. 1 and 2

A tree harvesting apparatus 10 according to the invention is shown mounted on a wheeled vehicle or skidder 12 as commonly used an logging operations, the skidder and prior art accessories thereof being shown in broken outline. The invention is characterized by a tree holding and cutting means 14 mounted on a blade assembly 15 of the skidder, and a tree storing means 17 mounted on a vehicle bed 18 positioned rearwardly of a driver's cab 19. The blade assembly 15 is a common earth moving assembly or bulldozer blade as fitted to skidders and has a transversely extending blade 21 carried on a pair of forwardly extending hinged arms 22, one arm only being shown. The arms can be swung through an arc 24 from a lowered or cutting position, as shown in FIG. 1, to a raised position shown at 22.1 in FIG. 2. The skidder 12 and a blade assembly 15 are conventional and are selected as a convenient means of mounting the invention, and alternative or equivalent vehicles and means to mount the invention can be substituted. The invention is shown mounted on an upper edge of the blade, but for some applications the invention could be mounted adjacent the lower edge of the blade, not shown. A fixed arm structure, also not shown, could be substituted for the swingable blade assembly but this would likely require modification of the invention for greater swinging movement. It can be seen that in the cutting position, the means 14 is positioned forwardly of the cab and is thus adjacent an end of the vehicle remote from the bunk 17.

The holding and cutting means 14 is characterized by a main post 26 mounted for longitudinal swinging relative to the vehicle about a generally vertical cutting position as shown in FIG. 1 in which the post has upper and lower ends 27 and 28. A hinge mounting 30 is adapted to be mounted on the vehicle 12, suitably on an upper edge 31 of the blade 21. A longitudinal tilting cylinder 29 extends between the hinge mounting 30 and one of the arms 22 of the blade assembly 15 so that extension and retraction of the cylinder 29 rotates the post about the hinge assembly to produce forward and backward tilting movement of the post 26 relative to the vehicle when viewed laterally. Thus the hinge mounting cooperates with the post to mount the post for forward and backward tilting movement relative to the vehicle between the essentially vertical cutting position as shown in FIG. 1 and an inclined unloading position as shown in FIG. 2. If the means 14 were mounted adjacent the lower edge of the blade, increased forward tilting of the post is possible which is particularly useful if the vehicle harvests trees by moving down a slope.

The holding and cutting means further includes upper and lower grapples 32 and 33 adjacent the upper and lower ends 27 and 28 of the post, the grapples being adapted to close and open so as to hold or release a tree 35. A tree cutting means 36 is mounted adjacent the lower end of the post and is disposed below the lower grapple when the post is vertical. The storing means 17 has a bunk 37 adapted to be carried on the vehicle, the bunk being positioned so that when the post 26 is swung backwards about the hinge mounting 30 to the unloading position the bunk cooperates with the upper and lower grapples to accept a log therefrom.

In FIG. 1 the grapples are shown enclosing the standing tree 35 prior to or during cutting with the means 36. In FIG. 2 the tree has been cut leaving a stump 39 and the holding and cutting means 14 is shown swung to the inclined unloading position with the tree being held by the grapples and also supported on the bunk 37 in an intermediate position 35.1. It is seen that when the grapples 32 and 33 grip a tall tree, center of gravity 40 of the tree is spaced rearwardly of the bunk 37. Thus when the grapples release the tree 35 the tree swings about the bunk in direction of an arrow 41 to attain a stored position 35.2 in which the crown of the tree, not shown, rests on the ground rearwardly of the vehicle, and a lower portion of the trunk of the tree is retained on the bunk 37 as will be described with reference to FIGS. 7 and 8. Thus the bunk cooperates with the grapples to accept the log therefrom so that a major portion of the log extends away from, i.e. rearwardly of, the cab, so as to restrict minimally visibility.

FIGS. 3–6

Figure 3:
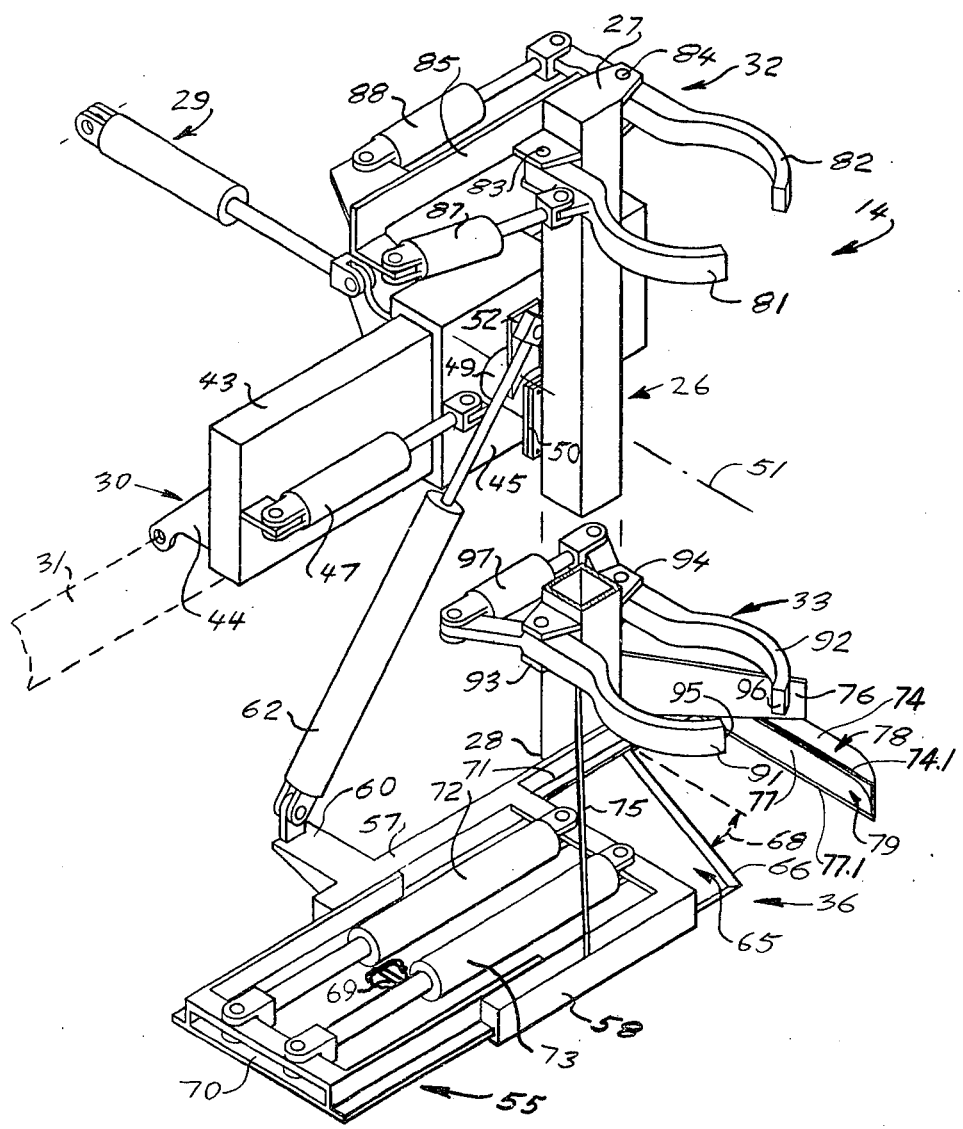
FIG. 3 is a simplified, fragmented isometric projection of a holding and cutting means of the invention remote from the vehicle, the grapples thereof being shown open and all hydraulic hoses, valves, etc., being omitted for clarity.

Referring mainly to FIG. 3, the holding and cutting means 14 includes a transversely extending bed 43 mounted forwardly of spaced brackets 44 of the hinge mounting 30, one bracket only being shown. The means 14 includes a carriage 45 mounted for movement along the bed and a traversing cylinder 47 extending between the carriage to cooperate with the bed so that extension and retraction of the cylinder 47 moves the carriage along the bed, that is laterally relative to the vehicle. A boss 49 extends longitudinally forwardly from the carriage 45 and carries a journal 50 at a forward end thereof, the post 26 being mounted on the journal 50 for rotation relative to the carriage about a longitudinally extending axis 51. Thus the boss 49 and the journal 50 serve as journalling means mounted on the carriage and cooperating with the post for journalling the post for rotation relative to the carriage to permit sideways tilting of the post. Other journalling means can be substituted. Sideways tilting of the post is particularly useful in sloping terrain where trees grow at angles other than normal to the ground and thus, if the vehicle were traversing around a hillside the post 26 would be inclined to be generally vertical to permit alignment of the post and grapples with the tree. Similarly, the bed 43, the carriage 45 and the traversing cylinder 47 serve as slide means cooperating with the hinge means to permit lateral sliding of the post relative to the vehicle. In difficult terrain, where the vehicle cannot move sideways easily, the slide means is particularly useful as it permits lateral positioning of the grapples and the tree cutting means to facilitate holding and cutting the tree with reduced respositioning of the vehicle itself. The slide means is also particularly useful in cutting a group of closely spaced trees in which the trees can be cut individually in sequence working laterally through the group without repositioning of the vehicle. Thus for cutting such a group of trees the vehicle is not required to move over a stump recently cut to reach an adjacent stump if the slide means has sufficient travel to produce, for example four feet of lateral movement of the post.

The tree cutting means 36 extends normally and laterally from the lower end 28 of the post 26, and has a knife blade guiding frame 55 having a pair of spaced parallel guides 57 and 58 disposed generally normally to the post and the axis 51, ie laterally relative to the skidder. Brackets 52 and 60 extend from the boss 49 and the guide 57 respectively and a sideways tilting cylinder 62 extends between the brackets 52 and 60 so that extension or retraction of the cylinder 62 rotates the post about the journal 50. Thus the cylinder 62 and associated brackets serve as sideways tilting means cooperating with the post to tilt the post sideways. The brackets 52 and 60 are convenient connectors cooperating with the carriage 45 and the post 26 for connecting to the sideways tilting cylinder 62. Clearly other sideways tilting means to serve the same purpose can be substituted. It can be seen that actuation of the cylinders 47 and 62 simultaneously produces sideways tilting of the post concurrently with transverse movement of the post along the bed and thus a skilled operator can smoothly and quickly align the post with a tree prior to cutting.

Referring to FIGS. 3 and 4, the cutting means 36 has a knife blade 65 slidably mounted to extend between the guides and has a cutting edge 66 disposed obliquely to the guides, that is at an angle 68 to a normal extending between the guides. The angle 68 is typically about 20°, but can probably be within an approximate range of 10° to 40°. The frame 55 includes a rear stop member 70 and an inner edge guide 71 which encloses an inner edge of the blade 65 sliding adjacent the guide 57 to restrain the inner edge against generally vertical movement. A lower web 69 extends between the guides 57 and 58 to maintain the guides parallel to support the full length of the knife blade and to protect the blade from beneath. A pair of parallel knife cylinders 72 and 73 extend between the rear stop member and the knife 65 so that extension and retraction of the cylinders 72 and 73 moves the knife blade relative to the guides. Thus the cylinders 72 and 73 serve as extensible means cooperating with the guiding frame and knife blade to move the blade along the guide frame for cutting a tree.

A pair of inclined steadying arms 75 and 76 diverge outwardly from the post to strengthen the tree cutting means 36 and simultaneously to define a vee to accept a tree therebetween prior to cutting. These arms facilitate guiding of the holding means so the post 26 can be seen to be generally aligned with the tree so that the grapples can cooperate with the tree as will be described. An anvil 78 cooperates with the frame and is positioned on a side of the post remote from the knife blade so as to be generally adjacent a limit of travel of the blade when the cylinders 72 and 73 are extended. As will be described with reference to FIG. 6, the anvil has a recessed working face 79 disposed oppositely to the cutting edge 66, the anvil being a channel-like member having two spaced generally parallel plates 74 and 77 having generally coplanar end faces 74.1 and 77.1 which are spaced apart sufficiently to receive the cutting edge 66 therebetween. Spacing between the plates provides clearance for the blade to permit the edge 66 of the knife blade 65 to enter the face so as to effect complete severing of the tree from its stump. The end faces 74.1 and 77.1 support a portion of the tree on each side of the blade to reduce splitting that frequently occurs with unsupported scissor-action shears. Clearly the anvil 78 is designed to withstand relatively large forces generated during cutting of the tree and the arm 76 is secured to the anvil 78 to strengthen the anvil against these forces.

Referring to FIGS. 3 and 5, the upper grapple 32 of the holding means has opposed first and second upper grap arms 81 and 82 journalled for rotation relative to the post about grab arm journals 83 and 84 respectively. A grab arm bracket 85 extends from the post and first and second grab arm cylinders 87 and 88 extend from ends of the bracket and along opposite sides of the bracket and cooperate with the respective arms 81 and 82. With suitable hydraulic controls the cylinders 87 and 88 can be operated independently to produce independent rotation of the grab arms about the bracket 85 which increases versatility of the grapple 32 which is also desirable in hilly terrain. When both the cylinders 87 and 88 are operated to extend simultaneously, it can be seen that reactions to forces from the cylinders on the bracket 85 can, by suitable design, be essentially balanced, thus essentially eliminating bending forces on the bracket 85.

In FIG. 3 it can be seen that the arms 81 and 82 are laterally spaced along the post 26 relative to each other to permit closure of the arms around a tree without interference between the arms. Thus, as seen in FIG. 5, when the grapple 32 is actuated to close, the arms 81 and 82 overlap and can grip one or more small trees therebetween, as shown in broken outline. Thus if a closely spaced group of small trees are to be harvested, a tree can be cut individually whilst holding a previously cut tree, so that two more trees can be moved by the grapples to the storing means at one time. A plurality of teeth 86 extends forwardly from the post adjacent to the grapple 32 to engage the tree or trees retained in the grapple 32 to eliminate essentially axial movement of the trees when the holding means swings the cut trees backwards onto the storing means 17. With most trees, when the grapple 32 squeezes the tree gripped therein, the tree is forced onto and retained on the teeth as shown, until shaken off onto the storing means.

Referring again to FIGS. 3 and 4, the lower grapple 33 has generally similar first and second lower grab arms 91 and 92 journalled for rotation relative to the post on first and second grab arm journals 93 and 94 respectively. A lower grapple actuating cylinder 97 extends between opposite ends of the arms so that appropriate actuation of the cylinder 97 opens or closes the grapple 33. The grab arms 91 and 92 are disposed relative to each other on the post 26 so as to be generally co-planar so that respective outer ends 95 and 96 thereof contact each other when the grapple is closed as seen in FIG. 4. Thus, in contrast to the upper arms 81 and 82 which, when closed, overlap each other to hold the upper portion of a tree, shown generally centrally in broken outline at 35.3, against the post essentially preventing movement of the tree gripped therein, the lower arms 91 and 92 do not overlap each other but, in general, merely define a generally circular enclosure which restricts but does not totally prevent relative lateral movement between the enclosed lower portion of the tree.

Thus when the tree is held securely by the upper grapple 32, the lower portion of the means 14 can swing about the grapple 32 within limits defined by the closed lower grapple 33 and the anvil 78, the cutting edge 66 or the guide 71. It is seen that as the knife blade 65 advances towards the tree, the edge 66 thereof contacts the tree and, if the tree does not bend, the face 79 of the anvil is drawn against the tree. It is noted that when the grapple is closed, an inner face 80 of the lower grab arm 92 is positioned outwardly of the face 79 to permit the tree to rest on the anvil face rather than on the arm 92. In contrast with the cylinders 87 and 88 which extend between the upper grab arms 81 and 82 and the bracket 85, the cylinder 97 extends between ends of the lower arms 91 and 92 themselves and thus the lower arms can swing simultaneously with the cylinder relative to the post, that is the lower grapple can effectively float to permit enclosure of standing trees and to permit the tree to rest against the anvil during cutting. This would be the case for most trees if the vehicle and post are positioned properly and some of the success of the invention is attributed to this aspect. Stops, severally 90, are provided on the arms 91 and 92 on opposed sides of brackets carrying the journals 93 and 94 to limit such floating movement of the arms. Thus while the upper grapple 32 requires independent movement of the arms 81 and 82 by actuation of the respective cylinders 87 and 88 and, if necessary, sideways or longitudinal tilting if the post 26 to align the grapple 32 relative to the tree, the lower grapple 33, can, within limits determined by the stops 90, be aligned more quickly and simply by floating the grapple 33 relative to the post.

Referring to FIG. 4 the angle 68 of the edge 66 also generates a force on the tree tending to move the tree outwards in direction of an arrow 89 so that the tree may also contact the arm 96. A reaction to this force on the blade 65 forces the inner edge of the blade into the guide 71 and any tendency of the blade to move upwards from the hard wood lower in the tree to softer wood higher in the tree is restricted to some extent by the guide 71. This tends to reduce bending of the blade.

Figure 6:
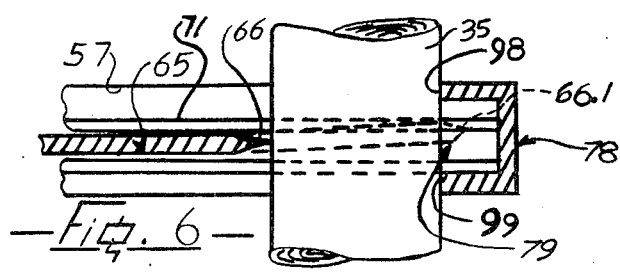
FIG. 6 is a simplified, fragmented section on line 6—6 of FIG. 4, showing the knife means cutting the tree.

Referring to FIG. 6, the recessed working face 79 of the anvil is defined in part by spaced upper and lower edges 98 and 99 which provide clearance for the blade edge 66 to enter the anvil. When the edge 66 engages the tree, the tree is forced against the edges 98 and 99 and, to completely sever the tree, the blade 65 enters the clearance between edges. This produces a particularay clean cut usually with negligible splintering of the tree which contrasts with many prior knives. Vertical spacing between the edges 98 and 99 permits some upward movement of the edge 66 to an upper position 66.1, broken outline, which tends to occur due to variations in wood hardness as discussed above. To allow for this upward movement of the blade, the blade is disposed lower than at a midposition between the edges 98 and 99. Note that an anvil with a recessed working face to receive the cutting edge of the blade does not require close manufacturing tolerances associated with opposed blades of common scissor shears, or an accurately machine cutting edge of a single shear blade working against a solid faced anvil.

Because only the upper grapple requires relatively precise alignment with the tree prior to gripping the tree, and the lower grapple tends to restrain the tree relatively loosely so that it bears against the anvil, the tree should not bend during cutting and thus the fibers in the tree are not subjected to excessive compression or tension during the cutting. This may contribute to the reduction in splitting resulting from the improved action of the blade 65 and anvil 78. With some prior harvesting machines, the upper and lower grapples and knives are connected in the same hydraulic circut and the cutting actuation sequence is usually as follows. The grapples first grip the tree simultaneously and relatively lightly, and the knife blade advances until its cutting edge engages the tree. As resistance to movement of the blade increases, the grapples tighten until they are squeezing the tree quite tightly and then the knife cuts. The gripping forces are sometimes somewhat in opposition to each other or the shape of the trunk, and the knife often cuts the trunk which is subject to bending resulting from its shape and tight grip of the grapple. It is felt that this bending aggravates splitting during cutting. A further advantage of the present invention is that because only the upper grapple requires relatively precise alignment, the time required to enclose the tree with both grapples is reduced from the time that would be required if both the upper and lower grapples required independent and precise movement of the respective grab arms. This of particular advantage in difficult terrain where each successive tree usually requires a different alignment from a prior tree.

Figure 7:
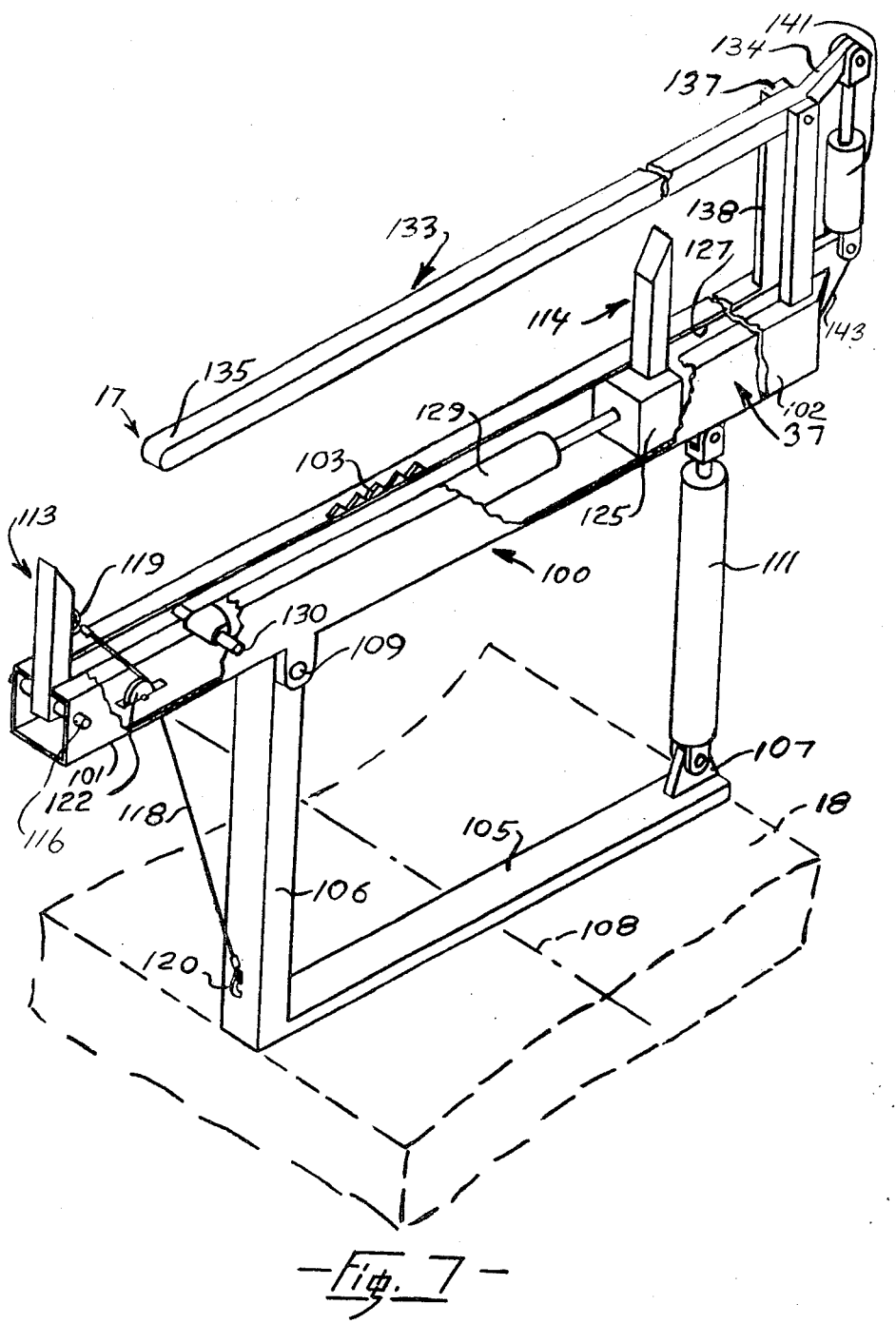
FIG. 7 is a simplified, fragmented isometric projection of a storing means of the invention in a carrying position, portions of the vehicle being shown in broken outline, all hydraulic hoses, valves, etc., being omitted.

FIGS. 7 and 8

Referring mainly to FIG. 7, the bunk 37 of the storing means 17 has a transverse, generally horizontal beam 100 having first and second ends 101 and 102. An upper surface of the beam 100 is provided with a plurality of teeth 103 extending between the first and second ends to reduce sliding of logs positioned on the beam between the ends. The teeth are designed to resist sliding of the logs longitudinally relative to the vehicle, and yet permit transverse sliding of the logs when the beam is tilted as will be described. The vehicle bed 18 carries a member 105 carrying a vertical column 106 at one end and a cylinder bracket 107 at an opposite end, a portion of the bed 18 being shown in broken outline relative to a longitudinal axis 108 of the vehicle. The beam 100 is hinged adjacent the first end 101 thereof to a journal 109 at an upper end of the column 106 to permit sideways tilting of the beam about the vehicle to unload logs supported on the bunk as will be described. A tilting cylinder 111 extends between the cylinder bracket 107 and a portion of the beam adjacent the second end 102 so as to cooperate with the beam for tilting the bunk about the hinge to unload logs carried on the bunk.

The storing means 17 includes a retractable first stake 113 adjacent the first end 101 of the beam, and a movable second stake 114. A hinge pin 116 hinges the first stake adjacent the first end and a flexible link or cable 118 extends from a first end 119 thereof which is secured to the first stake, to an opposite end 120 thereof which is secured adjacent a lower portion of the column 106. A sheave 122 is journalled adjacent the first end 101 of the beam and the flexible cable 118 passes over the sheave and through a clearance opening in the beam, the sheave 122 thus serving as a guide means cooperating with the link. The stake 113 is journalled below its center of gravity so that without the link 120 and under the influence of gravity it tends to swing outwards relative to the beam to obtain a retracted position aligned with the beam as shown in FIG. 8. The cable 118 thus has a length sufficient to permit the first stake to retract when the bunk is tilted as shown in FIG. 8, and to be tensioned to raise the stake automatically so as to be normal to the beam 100 when the bunk is levelled as shown in FIG. 7. Thus the stake is adapted to retract for unloading the logs from the bunk and to extend to retain the logs on the bunk.

The movable second stake 114 extends vertically from a slide block 125 which is carried in a longitudinally extending passage in the beam 100, the beam being hollow and having a cross-section generally complementary to the slide block 125 to permit movement of the block with the stake 114 along the beam, the stake extending through a clearance slot 127 which extends along an upper surface of the beam. A positioning cylinder 129 extends between a pin 130 carried in a portion of the beam and the slide block 125 for positioning the second stake relative to the beam. Thus the second stake is mounted on the beam for movement along the beam for repositioning the logs on the beam and to assist in loading and unloading the logs from the beam. Alternative means for automatically retracting the first stake and traversing the second stake 114 can be substituted. It can be seen that the tiltable beam 100 the cylinder III, the stakes 113 and 114 and associated structure serve as remotely operated powered unloading means associated with the bunk.

The storing means 17 further includes a clamping arm 133 having inner and outer ends 134 and 135, the arm being hinged for rotation adjacent the inner end thereof by a hinge 137 to an upper end of a retaining member 138 projecting upwardly from adjacent the second end of the beam 100. The member 138 is somewhat longer than maximum diameter of logs to be carried on the bunk so that when the beam is horizontal the clamping arm can extend transversely across the bunk and can be positioned generally above the beam to accept logs, not shown, between the clamping arm and the beam. The clamping arm is thus hinged adjacent the second end of the beam and a clamping arm actuating means, namely a cylinder 141, extends between the inner end 134 and a bracket 143 extending from the second end of the beam. It can be seen that actuation of the cylinder 141 swings the arm 133 about the hinge 137 between a clamped position, as shown in FIG. 7, in which the arm is generally parallel to the beam, and a released position, as shown in FIG. 8, in which the arm extends generally normally to the beam 100. In the clamping position the arm 133 retains the logs on the beam between the first and second stakes and the beam 100 and prevents the logs rolling off the beam prematurely should the vehicle 18 pass over uneven or laterally sloping terrain which otherwise might cause the logs to roll prematurely from the bunk. The clamping arm also exerts a downwards pressure on the logs forcing the larger of them onto the teeth 103 which also reduces chances of the logs sliding backwards off the bunk.

OPERATION

In operation, the vehicle is driven to a suitable logging site with the blade assembly 15 raised, the main post 26 generally horizontal as shown in FIG. 2, and the bunk 37 horizontal as shown in FIG. 7. Thus, if the vehicle is a conventional skidder, the invention does not restrict materially its manoeuvrability or climbing ability. The vehicle approaches a tree generally radially of the tree with the means 14 in the vertical cutting position as shown in FIG. 1. The steadying arms 75 and 76 are positioned to straddle the tree, and the grab arms 81 and 82 of the grapple 32, and the arms 91 and 92 of the grapple 33 are open and similarly straddle the tree. The cylinders 72 and 73 are extended so that the knife blade 65 is retracted to provide clearance for the tree to pass between the blade cutting edge 66 and the anvil 78. Ideally, prior to cutting the tree should be as close to the post 26 as practical, and if necesary, after positioning the skidder as close to the tree as practical, the traversing cylinder 47 can be actuated to position the post in relative the tree independently of the vehicle to ensure that the face 79 of the anvil is brought against the tree. The sideways tilting cylinder 62 can be actuated similarly to maintain the post 26 generally parallel with the tree. If the terrain is particularly uneven, the longitudinally tilting cylinder 29 can also be actuated so that, prior to actuation of the grapples 32 and 33 the post is adjusted to be parallel with the tree when viewed laterally and longitudinally. When the means 14 is set up properly aligned with the tree, the brake of the skidder is engaged and the clamping arm 133 of the storing means 17 is raised by retracting the cylinder 141 and the second stake 114 is traversed towards the second end 102 of the beam by extending the cylinder 129.

The first and second grab arm actuating cylinders 87 and 88 are now actuated so that the upper grapple 32 engages the tree to hold the tree on the teeth 86, and further minor positioning of the post relative to the tree may be required. The actuating cylinder 97 of the lower grapple 33 is actuated so that the outer ends 95 and 96 of the grab arms 91 and 92 contact each other to enclose the tree, but, because the grapple 33 essentially floats relative to the post 26, alignment of the post at the lower end 28 thereof is less critical. Care is taken to ensure that the anvil is maintained held against the tree. The knife cylinder 72 and 73 are then retracted so that the knife blade 65 slides along the guides and the cutting edge 66 severs the tree from the stump by passing into the face 79. The tree remains supported by the upper grapple and teeth 86, the lower end of the trunk is retained within the enclosure of the lower grapple 33 and the knife blade 65 is retracted to prevent damage thereto. The longitudinal tilting cylinder 29 is retracted, as best seen in FIG. 2, and the arm 22 of the blade assembly 15 is swung upwards to swing the trunk relative to the vehicle through approximately 90° until it rests on the bunk 37 of the storing means to attain the position 35.1 as shown in FIG. 2.

As the log is swung aft it is positioned between the first and second stakes 113 and 114 which are widely spaced apart and the grapples 32 and 33 are released. The movable stake 114 is then moved along the beam towards the first end 101 to push the log towards or against the first stake 113. When the log is released from the grapples the rearward position of the center of gravity thereof causes the log to rock backwards and, if there is any tendency to slide from the bunk the arm 133 can be lowered to the clamping position to hold it on the bunk. If the log is dropped from the grapples a short distance onto the beam 100, the teeth 103 tend to penetrate the log to reduce chances of the log sliding rearwards. The arm 133 can be left raised if the vehicle is not going to move very far to another tree, but it may have to be lowered to prevent interference with standing trees. The vehicle can now move to other trees and the procedure repeated with serveral other trees until there is sufficient number of logs lying between the first and second stakes, a practical limit being reached before the second stake 114 is held adjacent the retaining member 138.

When loaded sufficiently the vehicle can now move from the forest to an unloading area, and whilst the vehicle moves the clamping arm 133 is clamped down to retain logs on the bunk so that the tops of the cut trees drag behind the vehicle as it moves to the loading area. At the loading area the arm 133 is raised to the release position and the cylinder 111 actuated to tilt the bunk about the journal 109 and simultaneously the first stake 113 is retracted by tension of the cable 118 permitting the logs to roll or slide off the beam 100. Discharge of the logs from the bunk can be controlled by actuation of the movable stake 114 and the angle of inclination of the beam so as to reduce damage to the logs and reduce risk of danger to persons nearby which sometime arises when logs are rapidly and uncontrollably discharged from a vehicle. Note that the vehicle operator remains in the cab during discharge of the logs and thus is safe from the normal hazards of unloading logs. After unloading, the bunk is lowered to the horizontal position, and the arm 133 is lowered to permit the vehicle to move into the forest to harvest more trees.

I claim:

1. A tree harvesting apparatus for use with a vehicle having a driver's cab, the apparatus having a tree holding and cutting means and a tree storing means, the tree holding and cutting means being characterized by:
  (a) a main post mounted for swinging relative to the vehicle about a generally vertical cutting position in which the post has upper and lower ends,
  (b) upper and lower grapples adjacent the upper and lower ends of the post, the grapples being adapted to open and close so as to enclose a tree therein,
  (c) a hinge mounting for attachment to the vehicle for cooperating with the post to mount the post for forward and backward tilting movement relative to the vehicle when viewed laterally between an essentially vertical cutting position and an inclined unloading position,
  (d) a sideways tilting means cooperating with the post to tilt the post sideways to permit general alignment of the post with a tree,
  (e) slide means cooperating with the hinge mounting to permit lateral sliding of the post relative to the vehicle for lateral positioning of the grapples,
  (f) tree cutting means mounted adjacent the lower end of the post and disposed below the lower grapple when the post is vertical, and the tree storing means includes:
  (g) a bunk mounted on the vehicle and positioned adjacent an end of the vehicle remote from the holding and cutting means when in the cutting position so that when the post is swung relative to the vehicle to the unloading position the bunk cooperates with the upper and lower grapples to accept the log therefrom so that a major portion of the log extends away from the cab so as to restrict minimally visibility.

2. A tree harvesting apparatus as claimed in claim 1 in which the slide means includes:
  (a) a transversely extending bed mounted on the hinge mounting for hinging relative to the vehicle for forward and backward tilting of the bed,
  (b) a carriage mounted for movement along the bed and a journalling means mounted on the carriage and cooperating with the post for journalling the post for rotation relative to the carriage to permit sideways tilting of the post,
  (c) a transversing cylinder extending between the carriage and cooperating with the bed for movement of the carriage along the bed to permit lateral positioning of the post.

3. A tree harvesting apparatus as claimed in claim 1 in which the slide means includes:
  (a) a transversely extending bed mounted on the hinge mounting for hinging relative to the vehicle for forward and beckward tilting of the bed,
  (b) a carriage mounted for movement along the bed and a journalling means mounted on the carriage and cooperating with the post for journalling the post for rotation relative to the carriage to permit sideways tilting of the carriage,
  (c) a traversing means for moving the carriage along the bed to permit lateral positioning of the post, and the sideways tilting means includes:
  (d) a sideways tilting cylinder cooperating with means extending from the post and the carriage to permit sideways tilting of the post concurrently with transverse movement of the post along the bed.

4. A tree harvesting apparatus as claimed in claim 1 in which:
  (a) the upper grapple has first and second upper grab arms journalled for rotation relative to the post and spaced laterally along the post to permit closure of the upper arms around a tree without interference between the arms
  (b) the lower grapple has a pair of lower grab arms journalled for rotation relative the post and positioned relative to each other on the post so as to be generally co-planar, the lower grab arms having outer ends which contact each other when the lower grapple is closed so as to define an enclosure which restricts lateral movement of a portion of a tree enclosed therein.

5. A tree harvesting apparatus is claimed in claim 4 in which the upper grapple is further characterized by:
  (a) a grab arm bracket extending from the post,
  (b) first and second grab arm cylinders extending from and along opposite sides of the grab arm bracket and cooperating with the first and second upper grab arms respectively to provide independent opperation of the upper grab arms, and the lower grapple is further characterized by:
  (c) a lower grapple actuating cylinder extending between opposite ends of the lower grab arms,
  (d) stops cooperating with the lower grab arms to limit swinging of the lower grab arms relative to the post and yet to permit the lower grapple effectively to float relative to the post to permit relatively quick and simple alignment of the lower grapple with the post.

6. A tree harvesting apparatus as claimed in claim 1 in which the storing means includes a remotely operated powered unloading means characterized by:
  (a) a bunk secured to and extending transversely across the vehicle and positioned to accept cut logs from the holding and cutting means, the bunk having a transverse, generally horizontal beam having first and second ends and being hinged adjacent the first end thereof to the vehicle to permit tilting of the beam about the vehicle to unload logs supported on the bunk,
  (b) a tilting cylinder cooperating with the beam for tilting the beam about the hinge so as to unload logs carried on the bunk.

7. A tree harvesting apparatus as claimed in claim 6 in which the powered unloading means of the storing means further includes:
  (a) a retractable first stake adjacent the first end of the beam, the stake being adapted to retract for unloading the logs from, and to extend to retain the logs on, the bunk,
  (b) a movable second stake mounted on the beam for movement along the beam for positioning the logs on the beam and to assist in loading and unloading the logs.

8. A tree harvesting apparatus as claimed in claim 7 in which the powered unloading means includes:
  (a) a hinge pin hinging the first stake adjacent the first end of the beam at a position so that, when the bunk is tilted the pin permits the stake to swing downwards to unload the log,
  (b) a flexible link extending from the first stake to a position below the beam, the link cooperating with a guide means and having a length sufficient to permit the first stake to retract when the bunk is tilted so as to be aligned with the beam, and to be tensioned to raise the stake automatically when the bunk is levelled.

9. A tree harvesting apparatus as claimed in claim 6 in which the storing means further includes:
(a) a clamping arm extending transversely across the bunk and positioned generally above the beam when the beam is horizontal to accept logs between the clamping arm and the beam, the clamping arm being hinged for rotation adjacent an inner end thereof adjacent the second end of the beam,
(b) clamping arm actuating means cooperating with the clamping arm to swing the clamping arm between clamped and released positions.

10. A tree harvesting apparatus as claimed in claim 1 in which:
(a) in the cutting position the main post is positioned forwardly of the cab,
(b) the bunk is positioned rearwardly of the cab so that a major portion of the log extends rearwardly of the cab.

11. A tree harvesting apparatus for use with a vehicle, the apparatus having a tree holding and cutting means and a tree storing means, the holding and cutting means being characterized by:
(a) a main post mounted for swinging relative to the vehicle about a generally vertical cutting position in which the post has upper and lower ends,
(b) a hinge mounting for attachment to the vehicle for cooperating with the post to mount the post for forward and backward tilting movement relative to the vehicle when viewed laterally between an essentially vertical cutting position and an inclined unloading position,
(c) upper and lower grapples adjacent the upper end lower ends of the post, the grapples being adapted to close and open so as to enclose a tree therein,
(e) tree cutting means mounted adjacent the lower end of the post and disposed below the lower grapple when the post is vertical,
and the storing means includes:
(f) a bunk mounted on the vehicle and positioned so that when the post is swung relative to the vehicle to the unloading position the bunk cooperates with the upper and lower grapples to accept the log therefrom.
(d) slide means cooperating with the hinge mounting to permit lateral sliding of the post relative to the vehicle for lateral positioning of the grapples, 12. A tree harvesting apparatus as claimed in claim 11 in which the slide means includes:
(a) a transversely extending bed mounted on the hinge mounting for hinging relative to the vehicle for forward and backward tilting of the bed,
(b) a carriage mounted for movement along the bed and a journalling means mounted on the carriage and cooperating with the post for journalling the post for rotation relative to the carriage to permit sideways tilting of the post,
(c) a traversing cylinder extending between the carriage and cooperating with the bed for movement of the carriage along the bed to permit lateral positioning of the post.

13. A tree harvesting apparatus as claimed in claim 11 in which the holding and cutting means includes:
(a) a sideways tilting means cooperating with the post to tilt the post sideways to permit alignment of the post and grapples with a tree.

14. A tree harvesting apparatus as claimed in claim 11 in which the holding and cutting means includes:
(a) a transversely extending bed mounted on the hinge mounting for hinging relative to the vehicle for forward and backward tilting of the bed,
(b) a carriage mounted for movement along the bed and a journalling means mounted on the carriage and cooperating with the post for journalling the post for rotation relative to the carriage to permit sideways tilting of the carriage,
(c) a traversing means for moving the carriage along the bed to permit lateral positioning of the post,
and the sideways tilting means includes:
(d) a sideways tilting cylinder cooperating with means extending from the post and the carriage to permit sideways tilting of the post concurrently with transverse movement of the post along the bed.

15. A tree harvesting apparatus as claimed in claim 11 in which the tree cutting means includes:
(a) a knife guiding frame secured adjacent the lower end of the post and having a pair of spaced parallel guides disposed generally normally to the post and laterally of the vehicle,
(b) a knife blade slidably mounted to extend between the guides and having a cutting edge disposed obliquely to the guides,
(c) an extensible means cooperating with the guiding frame and the blade to move the blade along the guides for cutting a tree,
(d) an anvil cooperating with the guiding frame and having a recessed working face disposed opposite to the cutting edge of the blade, the face being the recessed to provide clearance for the blade to permit the cutting edge thereof to enter the face to effect complete severing of the tree.

16. A tree harvesting apparatus as claimed in claim 15 in which
(a) the working face of the anvil is disposed relative to the lower grapple so as to contact the log when the lower grapple is closed and encloses the log.

17. A tree harvesting apparatus is claimed in claim 11 in which
(a) the upper grapple has first and second upper grab arms journalled for rotation relative to the post and spaced laterally along the post to permit closure of the upper arms around a tree without interference between the arms,
(b) the lower grapple has a pair of lower grab arms journalled for rotation relative the post and positioned relative to each other on the post so as to be generally co-planar, the lower grab arms having outer ends which contact each other when the lower grapple is closed so as to define an enclosure which restricts lateral movement of a portion of a tree enclosed therein.

18. A tree harvesting apparatus is claimed in claim 17 in which the upper grapple is further characterized by:
(a) a grab arm bracket extending from the post,
(b) first and second grab arm cylinders extending from and along opposite sides of the grab arm bracket and cooperating with the first and second upper grab arms respectively to provide independent operation of the upper grab arms,
and the lower grapple is further characterized by:
(c) a lower grapple actuating cylinder extending between opposite ends of the lower grab arms,
(d) stops cooperating with the lower grab arms to limit swinging of the lower grab arms relative to the post and yet to permit the lower grapple effectively to float relative to the post to permit relatively quick and simple alignment of the lower grapple with the post.

19. A tree harvesting apparatus as claimed in claim 11 in which the storing means includes a remotely operated powered unloading means characterized by:
(a) a bunk secured to and extending transversely across the vehicle and positioned to accept cut logs from the holding and cutting means, the bunk having a transverse, generally horizontal beam having first and second ends and being hinged adjacent the first end thereof to the vehicle to permit tilting of the beam about the vehicle to unload logs supported on the bunk,
(b) a tilting cylinder cooperating with the beam for tilting the beam about the hinge so as to unload logs carried on the bunk.

20. A tree harvesting apparatus as claimed in claim 19 in which the powered unloading means of the storing means further includes:
(a) a retractable first stake adjacent the first end of the beam, the stake being adapted to retract for unloading the logs from, and to extend to retain the logs on, the bunk,
(b) a movable second stake mounted on the beam for movement along the beam for positioning the logs on the beam and to assist in loading and unloading the logs.

21. A tree harvesting apparatus as claimed in claim 20 in which the powered unloading means includes:
(a) a hinge pin hinging the first stake adjacent the first end of the beam at a position so that, when the bunk is tilted the pin permits the stake to swing downwards to unload the log,
(b) a flexible link extending from the first stake to a position below the beam, the link cooperating with a guide means and having a length sufficient to permit the first stake to retract when the bunk is tilted so as to be aligned with the beam, and to be tensioned to raise the stake automatically when the bunk is levelled.

22. A tree harvesting apparatus as claimed in claim 19 in which the storing means further includes:
(a) a clamping arm extending transversely across the bunk and positioned generally above the beam when the beam is horizontal to accept logs between the clamping arm and the beam, the clamping arm being hinged for rotation adjacent an inner end thereof adjacent the second end of the beam,
(b) clamping arm actuating means cooperating with the clamping arm to swing the clamping arm between clamped and released positions.

23. A tree harvesting apparatus as claimed in claim 11 in which:
(a) in the cutting position the main post is positioned forwardly of the cab,
(b) the bunk is positioned rearwardly of the cab so that a major portion of the log extends rearwardly of the cab.

* * * * *